(12) United States Patent
Bilinski et al.

(10) Patent No.: US 9,467,490 B1
(45) Date of Patent: *Oct. 11, 2016

(54) DISPLAYING AUTO-GENERATED FACTS ABOUT A MUSIC LIBRARY

(71) Applicant: Google Inc., Mountain View, CA (US)

(72) Inventors: Brandon Bilinski, San Francisco, CA (US); Owen Daniel Otto, Oakland, CA (US); Vera Khovanskaya, Ithaca, NY (US); Colin Zwiebel, Salt Lake City, UT (US); Yashvir Sekhon, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 62 days.

This patent is subject to a terminal disclaimer.

(21) Appl. No.: 14/076,991

(22) Filed: Nov. 11, 2013

Related U.S. Application Data (63) Continuation of application No. 13/297,603, filed on Nov. 16, 2011, now Pat. No. 8,612,442.

(51) Int. Cl.
*H04L 29/06* (2006.01)
*G06F 17/30* (2006.01)

(52) U.S. Cl.
CPC ......... *H04L 65/60* (2013.01); *G06F 17/30749* (2013.01); *G06F 17/30772* (2013.01)

(58) Field of Classification Search
CPC ............. H04L 65/60; G06F 17/30772; G06F 17/30749
USPC ........................................................ 707/736
See application file for complete search history.

(56) References Cited

U.S. PATENT DOCUMENTS 6,226,672 B1 * 5/2001 DeMartin ................ G09B 7/04
369/30.08

7,624,416 B1 11/2009 Vandermolen et al.
(Continued)

FOREIGN PATENT DOCUMENTS

CN 101446949 A 6/2009
CN 102099805 A 6/2011
(Continued)

OTHER PUBLICATIONS

Notification of Transmittal of the International Search Report and the Written Opinion of the International Searching Authority, issued in International Application No. PCT/US2012/065669, dated Apr. 1, 2013 (12 total pages).
(Continued)

*Primary Examiner* — Phuong Thao Cao
(74) *Attorney, Agent, or Firm* — Morris & Kamlay LLP (57) ABSTRACT

A method for surfacing auto-generated facts about an online music library is provided, including: receiving from a client device a request to access an online music library associated with a user, the online music library including a plurality of audio files, each of the plurality of audio files including audio data and metadata associated with the audio data; applying a fact template to the metadata to generate a result, the fact template defining an analysis to be performed on the metadata, the fact template defining a threshold requirement for performance of the analysis defined by the fact template; transmitting to the client device a music application code configured to be executed by a browser application on the client device, the music application code including posting logic configured to display the result of the analysis performed according to the fact template in said browser application on the client device.

20 Claims, 10 Drawing Sheets

(56) References Cited

U.S. PATENT DOCUMENTS

| | | | |
|---|---|---|---|
| 7,650,570 B2* | 1/2010 | Torrens | G06F 17/30017 715/727 |
| 7,685,132 B2 | 3/2010 | Hyman | |
| 7,707,210 B2 | 4/2010 | Stefik et al. | |
| 7,720,871 B2 | 5/2010 | Rogers et al. | |
| 7,756,915 B2* | 7/2010 | Ben-Yaacov | G06F 17/30026 707/899 |
| 7,783,489 B2 | 8/2010 | Kenyon et al. | |
| 7,797,300 B2* | 9/2010 | Kalis | G06F 17/30749 707/706 |
| 7,853,712 B2 | 12/2010 | Amidon et al. | |
| 7,979,442 B2 | 7/2011 | Hyman | |
| 8,024,419 B2 | 9/2011 | Gudorf | |
| 8,090,719 B2* | 1/2012 | Wade | G06F 17/30864 707/706 |
| 8,161,071 B2 | 4/2012 | LaJoie et al. | |
| 8,221,290 B2 | 7/2012 | Vincent et al. | |
| 8,233,999 B2 | 7/2012 | Herberger et al. | |
| 8,238,667 B2* | 8/2012 | Hosaka et al. | 382/217 |
| 8,276,076 B2 | 9/2012 | Torrens et al. | |
| 8,285,085 B2 | 10/2012 | Manico et al. | |
| 8,799,297 B2* | 8/2014 | Holsman | 707/751 |
| 8,930,400 B2* | 1/2015 | Adamic et al. | 707/781 |
| 9,075,963 B2* | 7/2015 | Nazar | G06F 21/105 |
| 2003/0023754 A1* | 1/2003 | Eichstadt et al. | 709/246 |
| 2005/0038819 A1* | 2/2005 | Hicken | G06F 17/30743 |
| 2005/0138056 A1* | 6/2005 | Stefik et al. | 707/102 |
| 2006/0080103 A1* | 4/2006 | Van Breemen | G06F 17/30017 704/270 |
| 2006/0195512 A1 | 8/2006 | Rogers et al. | |
| 2006/0195789 A1 | 8/2006 | Rogers et al. | |
| 2006/0195790 A1 | 8/2006 | Beaupre et al. | |
| 2007/0005266 A1* | 1/2007 | Blevins et al. | 702/22 |
| 2007/0038610 A1 | 2/2007 | Omoigui | |
| 2007/0064121 A1* | 3/2007 | Issa | G06Q 30/02 348/231.2 |
| 2007/0136286 A1 | 6/2007 | Webster et al. | |
| 2007/0220025 A1* | 9/2007 | Hyman | 707/101 |
| 2007/0233726 A1* | 10/2007 | Torrens | G06F 17/30017 |
| 2008/0005688 A1 | 1/2008 | Najdenovski et al. | |
| 2008/0052371 A1* | 2/2008 | Partovi | G06Q 10/10 709/217 |
| 2008/0091771 A1* | 4/2008 | Allen et al. | 709/203 |
| 2008/0154696 A1* | 6/2008 | Spiegelman | G06F 17/30867 705/7.32 |
| 2008/0201299 A1 | 8/2008 | Lehikoinen et al. | |
| 2008/0250315 A1* | 10/2008 | Eronen et al. | 715/706 |
| 2009/0012959 A1 | 1/2009 | Ylivainio et al. | |
| 2009/0070338 A1* | 3/2009 | Spitzig | G06Q 10/10 |
| 2009/0070363 A1 | 3/2009 | Bull et al. | |
| 2009/0076821 A1 | 3/2009 | Brenner et al. | |
| 2009/0112839 A1* | 4/2009 | Fisher | H04L 65/60 |
| 2009/0138505 A1* | 5/2009 | Purdy | G06F 17/30743 |
| 2009/0158146 A1 | 6/2009 | Curtis et al. | |
| 2009/0177654 A1 | 7/2009 | Beaupre et al. | |
| 2009/0198732 A1* | 8/2009 | Ross | G06F 17/30011 |
| 2009/0228423 A1 | 9/2009 | Hicken et al. | |
| 2009/0234791 A1 | 9/2009 | Delmonico et al. | |
| 2009/0265356 A1 | 10/2009 | Hyman et al. | |
| 2009/0306797 A1* | 12/2009 | Cox | G06F 17/30743 700/94 |
| 2010/0071013 A1 | 3/2010 | Vandermolen et al. | |
| 2010/0082135 A1 | 4/2010 | Amidon et al. | |
| 2010/0095212 A1 | 4/2010 | Torrens et al. | |
| 2010/0115021 A1 | 5/2010 | Lim et al. | |
| 2010/0205222 A1 | 8/2010 | Gajdos et al. | |
| 2010/0222899 A1* | 9/2010 | Blevins et al. | 700/80 |
| 2010/0223223 A1 | 9/2010 | Sandler et al. | |
| 2010/0229088 A1 | 9/2010 | Nakajima et al. | |
| 2010/0251101 A1 | 9/2010 | Haussecker et al. | |
| 2010/0262711 A1 | 10/2010 | Bouazizi | |
| 2011/0035031 A1 | 2/2011 | Faenger et al. | |
| 2011/0035705 A1* | 2/2011 | Faenger | G06F 17/30053 715/811 |
| 2011/0078172 A1 | 3/2011 | LaJoie et al. | |
| 2011/0125795 A1 | 5/2011 | Skowronek et al. | |
| 2011/0138330 A1 | 6/2011 | Sanders et al. | |
| 2011/0138331 A1 | 6/2011 | Pugsley et al. | |
| 2011/0145289 A1* | 6/2011 | Christiansen et al. | 707/780 |
| 2011/0199180 A1* | 8/2011 | Holman | 340/4.42 |
| 2011/0208616 A1 | 8/2011 | Gorman et al. | |
| 2011/0209062 A1 | 8/2011 | Faenger et al. | |
| 2011/0257772 A1 | 10/2011 | Kerber et al. | |
| 2011/0261398 A1* | 10/2011 | Mihara | H04N 1/00464 358/1.15 |
| 2011/0279846 A1* | 11/2011 | Nakashima | H04N 1/00244 358/1.13 |
| 2011/0280497 A1* | 11/2011 | Berger | G06F 17/30274 382/306 |
| 2011/0283210 A1* | 11/2011 | Berger | G06F 17/30244 715/765 |
| 2011/0295843 A1* | 12/2011 | Ingrassia et al. | 707/723 |
| 2011/0302184 A1 | 12/2011 | Gudorf | |
| 2011/0314368 A1* | 12/2011 | Chevalier | G06F 17/3089 715/234 |
| 2012/0023403 A1* | 1/2012 | Herberger | G06F 17/30743 715/716 |
| 2012/0088477 A1 | 4/2012 | Cassidy | |
| 2012/0096088 A1* | 4/2012 | Fahmy | 709/204 |
| 2012/0102124 A1 | 4/2012 | Hansson et al. | |
| 2012/0143923 A1* | 6/2012 | Whitney et al. | G06F 17/30997 707/803 |
| 2012/0232681 A1* | 9/2012 | Mundy | G06F 17/30053 700/94 |
| 2012/0246178 A1* | 9/2012 | Holsman | 707/751 |
| 2012/0254363 A1* | 10/2012 | Martin et al. | 709/219 |
| 2013/0036208 A1* | 2/2013 | Dochez | G06F 9/5077 709/220 |
| 2013/0103677 A1* | 4/2013 | Chakra | G06F 17/30994 707/723 |
| 2013/0123583 A1* | 5/2013 | Hill | 600/300 |
| 2013/0124517 A1* | 5/2013 | Bilinski | G06F 17/30749 707/736 |
| 2015/0154658 A1* | 6/2015 | Worthen | G11B 27/034 705/14.72 |

FOREIGN PATENT DOCUMENTS

| | | |
|---|---|---|
| JP | 2004-252882 A | 9/2004 |
| KR | 10-0890993 B1 | 3/2009 |
| WO | 2008/033840 | 3/2008 |

OTHER PUBLICATIONS

Communication pursuant to Article 94(3) EPC (Examination Report) dated Apr. 13 2016, issued in European Application No. 12850342.2.

English Translation of the First Office Action from the State Intellectual Property Office of the People's Republic of China dated May 18, 2015, issued in Chinese Application No. 201280056644.1.

Extended European Search Report dated Jun. 19, 2015 issued in European Application No. 12850342.2.

* cited by examiner

The most popular words in your song titles are "X," "Y," and "Z."

Fig. 7A

You love the 80's. X% of your library is from that decade.

Fig. 7B

You have more songs from [artist] than all your [genre] songs put together!

Fig. 7C

You have X days of [genre] in your library.

Fig. 7D

[genre] is your most neglected genre.

DISPLAYING AUTO-GENERATED FACTS ABOUT A MUSIC LIBRARY

CLAIM OF PRIORITY

This application claims priority as a continuation of U.S. application Ser. No. 13/297,603, filed Nov. 16, 2011, now issued as U.S. Pat. No. 8,612,442, entitled "DISPLAYING AUTO-GENERATED FACTS ABOUT A MUSIC LIBRARY," the disclosure of which is herein incorporated by reference.

BACKGROUND

1. Field of the Invention

The present invention relates to methods, systems, and computer programs for surfacing auto-generated facts about a music library.

2. Description of the Related Art

Internet applications have grown tremendously over the years and so have the functionality provided to devices that access those applications. One area that has seen such growth relates to audio file management. As users continue to purchase and store more audio music files on their devices, management of those files becomes ever more important. Commonly, users have music libraries on various devices and those devices are usually backed up from time to time. If a user has more than one device, more synchronization is necessary to ensure that each device has access to the desired music. As users upgrade their devices or lose their devices, added complexities arise in syncing new devices to older music libraries. Many times, the management becomes so extensive that users lose some or most of their libraries.

To address these issues, services are now being provided to allow online cloud storage of their music files. However, improvement is still needed to address various challenges posed by cloud storage. It is in this context that embodiments arise.

SUMMARY

Embodiments of the present invention provide methods, systems, and computer programs for surfacing auto-generated facts about a music library. It should be appreciated that the present invention can be implemented in numerous ways, such as a process, an apparatus, a system, a device or a method on a computer readable medium. Several inventive embodiments of the present invention are described below.

In one embodiment, a method for surfacing auto-generated facts about a music library is provided. The method initiates with receiving from a client device a request to access an online music library associated with a user, the music library including a plurality of audio files, each of the audio files including audio data and metadata associated with the audio data. The metadata of the audio files in the music library are transmitted to the client device. A music application code is transmitted to the client device, the music application code configured to be executed by a browser application on the client device, the music application code including a fact template defining an analysis to be performed on the transmitted metadata and posting logic configured to display a result of the analysis performed according to the fact template in said browser application on the client device.

In one embodiment, the posting logic is configured to display the result in a predefined window of a graphical user interface for managing and streaming the audio files of the music library.

In one embodiment, the result of the analysis defines a fractional amount of the music library. In one embodiment, the posting logic is configured to adjust an icon in accordance with the fractional amount and display the icon on the client device.

In one embodiment, the analysis defined by the fact template parses one or more of the following from the metadata: title, genre, artist, duration, rating, number of times played.

In one embodiment, the fact template defines a threshold requirement for performance of the analysis defined by the fact template.

In one embodiment, the threshold requirement defines a minimum number of audio files having a specified metadata feature.

In another embodiment, a method for surfacing auto-generated facts about a music library on a client device is provided. The method includes executing a browser application, and sending a request via the browser application to a server to access an online music library associated with a user. The music library includes a plurality of audio files, each of the audio files including audio data and metadata associated with the audio data. The metadata of the audio files in the music library is received from the server. The received metadata is stored in a local cache on the client device. A music application code is received from the server. The music application code is executed in the browser application on the client device. The execution of the music application code includes performing an analysis of the stored metadata in the local cache as defined by a fact template included in the music application code, and displaying a result of the analysis in the browser application on the client device.

In one embodiment, the displaying of the result of the analysis is in a predefined window of a graphical user interface for managing and streaming the audio files of the music library.

In one embodiment, the result of the analysis defines a fractional amount of the music library.

In one embodiment, displaying the result of the analysis includes adjusting an icon in accordance with the fractional amount and displaying said icon on the client device.

In one embodiment, the analysis defined by the fact template parses one or more of the following from the stored metadata in the local cache: title, genre, artist, duration, rating, number of times played.

In one embodiment, the fact template defines a threshold requirement for performance of the analysis defined by the fact template.

In one embodiment, the threshold requirement defines a minimum number of audio files having a specified metadata feature.

In another embodiment, a tangible computer readable medium containing program instructions embodied thereon for surfacing auto-generated facts about a music library is provided. The program instructions are configured for: receiving from a client device a request to access an online music library associated with a user, the music library including a plurality of audio files, each of the audio files including audio data and metadata associated with the audio data; transmitting the metadata of the audio files in the music library to the client device; and transmitting to the client device a music application code configured to be executed by a browser application on the client device, the music application code including a fact template defining an analysis to be performed on the transmitted metadata and posting logic configured to display a result of the analysis performed according to the fact template in said browser application on the client device.

In another embodiment, a system for surfacing auto-generated facts about an audio library is provided. The system includes an audio storage for storing an online audio library associated with a user, the audio library including a plurality of audio files, each of the audio files including audio data and metadata associated with the audio data. A server is configured to receive from a client device a request to access the audio library, and in response to receiving the request, transmit the metadata of the audio files in the audio library to the client device, and transmit to the client device an audio application code configured to be executed by a browser application on the client device, the audio application code including a fact template defining an analysis to be performed on the transmitted metadata and posting logic configured to display a result of the analysis performed according to the fact template in said browser application on the client device.

In another embodiment, a method for surfacing auto-generated facts about an online music library is provided, including: receiving from a client device a request to access an online music library associated with a user, the online music library including a plurality of audio files, each of the plurality of audio files including audio data and metadata associated with the audio data; applying a fact template to the metadata to generate a result, the fact template defining an analysis to be performed on the metadata, the fact template defining a threshold requirement for performance of the analysis defined by the fact template; transmitting to the client device a music application code configured to be executed by a browser application on the client device, the music application code including posting logic configured to display the result of the analysis performed according to the fact template in said browser application on the client device.

In one embodiment, the music application code defines an interface for managing and streaming the plurality of audio files of the online music library; wherein the posting logic is configured to display the result in a predefined window of the interface.

In one embodiment, the result of the analysis defines a fractional amount of the online music library.

In one embodiment, the posting logic is configured to adjust an icon in accordance with the fractional amount and display said icon on the client device.

In one embodiment, the analysis defined by the fact template parses one or more of the following from the metadata: title, genre, artist, duration, rating, number of times played.

In one embodiment, the threshold requirement defines a minimum number of audio files having a specified metadata feature.

In one embodiment, the specified metadata feature is selected from an artist, a genre, a rating, or a minimum number of plays.

In one embodiment, the threshold requirement defines one of a minimum number of audio files or a minimum length of time.

In one embodiment, displaying the result includes displaying a share button for sharing the result to a social network.

In another embodiment, a method for surfacing auto-generated facts about an online music library is provided, including: receiving from a client device a request to access an online music library associated with a user, the online music library including a plurality of audio files, each of the plurality of audio files including audio data and metadata associated with the audio data; applying a plurality of fact templates to the metadata to generate a plurality of results, each fact template defining an analysis to be performed on the metadata, wherein at least one of the plurality of fact templates defines a threshold requirement for performance of the analysis defined by the at least one of the plurality of fact templates; storing the plurality of results in a queue; transmitting to the client device a music application code configured to be executed by a browser application on the client device, the music application code including posting logic configured to retrieve and display results from the queue in said browser application on the client device; wherein the posting logic is configured to display the results in a predefined window of a graphical user interface for managing and streaming the plurality of audio files of the online music library.

In one embodiment, the posting logic is configured to retrieve and display the results from the queue in an order in which the results are stored to the queue.

In one embodiment, the posting logic is configured to retrieve and display the results from the queue based on one or more of user input, user interaction with the graphical user interface, a recent song play, a current song play, or a timer.

In one embodiment, the posting logic is configured to retrieve and display a result from the queue in response to playback of a new song.

In another embodiment, a non-transitory computer readable medium containing program instructions embodied thereon is provided for surfacing auto-generated facts about an online music library, the program instructions for: receiving from a client device a request to access an online music library associated with a user, the online music library including a plurality of audio files, each of the plurality of audio files including audio data and metadata associated with the audio data; applying a fact template to the metadata to generate a result, the fact template defining an analysis to be performed on the metadata, the fact template defining a threshold requirement for performance of the analysis defined by the fact template; transmitting to the client device a music application code configured to be executed by a browser application on the client device, the music application code including posting logic configured to display the result of the analysis performed according to the fact tem s late in said browser application on the client device.

Other aspects will become apparent from the following detailed description, taken in conjunction with the accompanying drawings.

BRIEF DESCRIPTION OF THE DRAWINGS

The invention may best be understood by reference to the following description taken in conjunction with the accompanying drawings.

DETAILED DESCRIPTION

The following embodiments describe methods, computer programs, and systems for surfacing auto-generated facts about a music library.

It will be apparent, that the present embodiments may be practiced without some or all of these specific details. In other instances, well known process operations have not been described in detail in order not to unnecessarily obscure the present embodiments.

Figure 1:
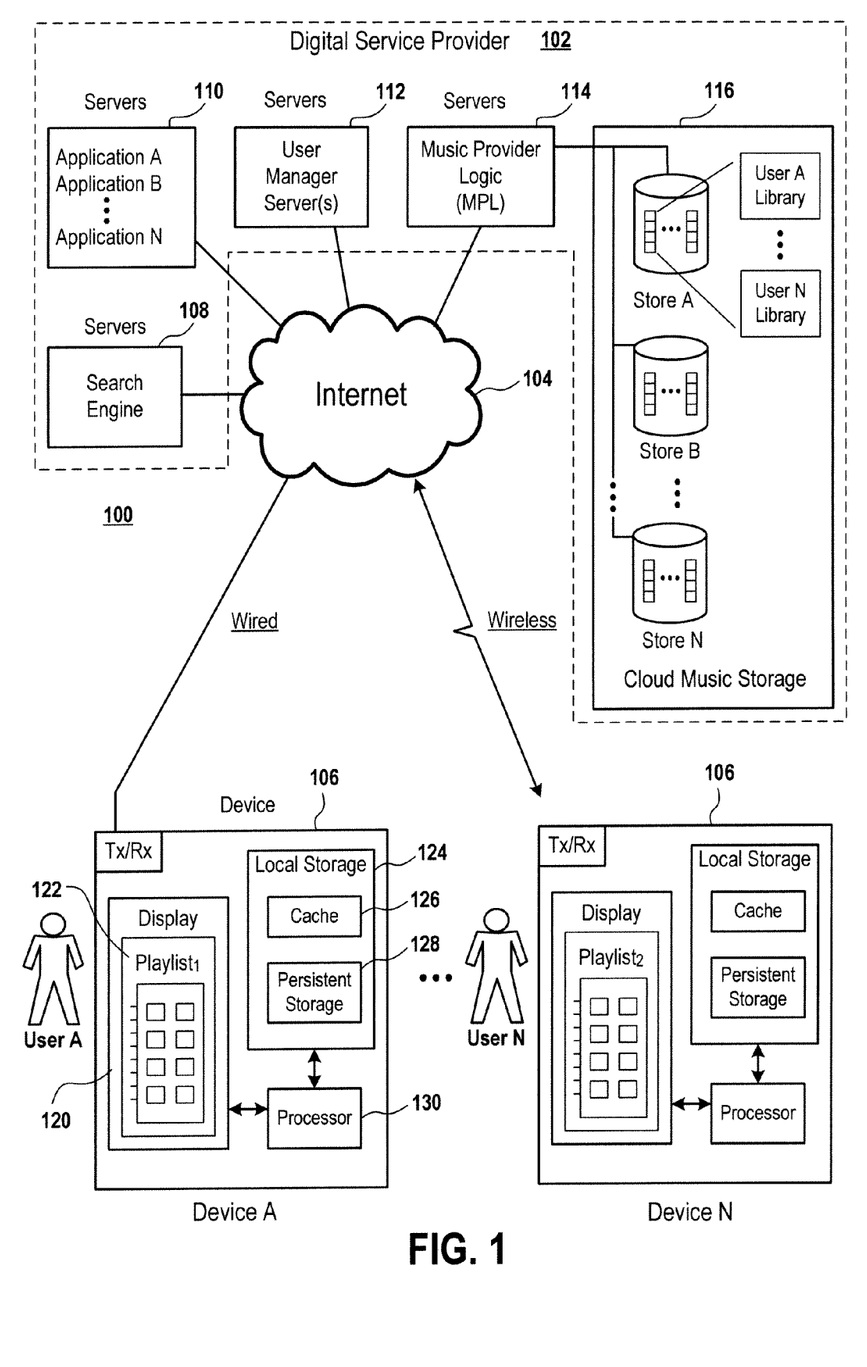
FIG. 1 illustrates a system diagram for enabling access and playing of music files stored in cloud storage, in accordance with one embodiment of the present invention.

FIG. 1 illustrates a system diagram 100 that defines methods for accessing and playing music files stored in cloud storage, and improving the rate at which playing of a music file response to user selection, is disclosed in accordance with one embodiment of the present invention. The system includes a plurality of servers that are connected to the Internet 104. The plurality of servers and storage are, in one embodiment, part of a digital service provider 102. The digital service provider 102, is a system that can include a plurality of servers that can provide applications, services, digital content, and interconnectivity between systems, applications, users, and social networks. For example, the digital service provider 102 can include a search engine 108, a plurality of servers 110 that provide applications for various business, social, and technology related subject matter, servers that provide user management 112, and servers to provide music related services.

One example digital service provider 102 can be Google Inc., of Mountain View, Calif. Other digital service providers can be more focused to provide only specific services, while others provide a variety of services for access, download, viewing, searching, etc. The content can vary greatly, but is commonly presented in digital format and displayed on monitors or screens of devices, computers, smart phones, tablets, etc.

The servers that provide music related services, in one embodiment, are illustrated by the music provider logic (MPL) 114, that executes over one or more servers that are connected to the Internet 104. The music provider logic 114 is shown connected to cloud music storage 116. Cloud music storage 116 is shown to include a plurality of storage systems, identified as store A, store B, and store N. The various storage systems that hold music data and music metadata, are provided with fast access to the Internet, for providing music data on demand to users requiring access to their music library stored in cloud music storage 116. In one embodiment, users can access the cloud music storage 116 by way of a plurality of devices 106. The plurality of devices can include any type of device having a processor and memory, wired or wireless, portable or not portable. In the example illustrated in FIG. 1, user A is shown to have device 106 (device A). Device 106 is shown to include communication logic for transmitting and receiving data between device 106 and the Internet 104.

The communication logic (Tx/Rx) can include various types of network interface circuitry, radio-communication (e.g. wireless), cell tower communication, or interconnected wiring connected to Internet service providers. Device 106 is also shown to include a display having a screen 120, local storage 124, and a processor 130. Local storage 124 can include cache memory 126, persistent storage 128, and other logic. In this example, device 106 is shown to include graphical icons (e.g., graphical user interfaces GUIs) that represent a play list. The screen 120 can be a touch-screen, or a display typically provided by a flat-panel display, a cathode ray tube (CRT), or other media capable of rendering a display. Still further, device 106 can have its display separate from the device, similar to a desktop computer or a laptop computer. Still further yet, device 106 can be in the form of a smart phone, a tablet computer, or hybrids that provide touch-screen capability in a portable form factor. One example device can include a portable phone device that runs an operating system and is provided with access to various applications (apps) that may be obtained over the Internet, and executed on the local portable device (e.g., smart phone, tablet, laptop, desktop, etc.).

In one embodiment, the user of device 106 can install an application that provides cloud storage of music files, and access to the storage cloud music files from the device 106. Once the user's music files are uploaded to the cloud music storage 116, the user's music files are associated to a library of the user. In one embodiment, a plurality of users can access the same application and can upload their own music files to create their own library, which will be stored in the cloud music storage 116.

Each of such users can then access the cloud music storage 116 through an application on their device 106 to render and play selected music files on their device, when the device 106 has access to the Internet and associated servers of the music providing logic 114 and cloud music storage 116. Accordingly, users can access the music application on their device 106, access all music files stored in cloud music storage 116, arrange music titles in their music library into playlists, add music to the cloud music storage 116, delete music from the cloud music storage 116, and purchase music that is added to the cloud music storage 116. These changes are maintained and managed by the music provider logic 114 and music provider logic 114 will provide access to the various users to their music files stored in the cloud music storage 116, based on their selections during use of the application.

Figure 2:
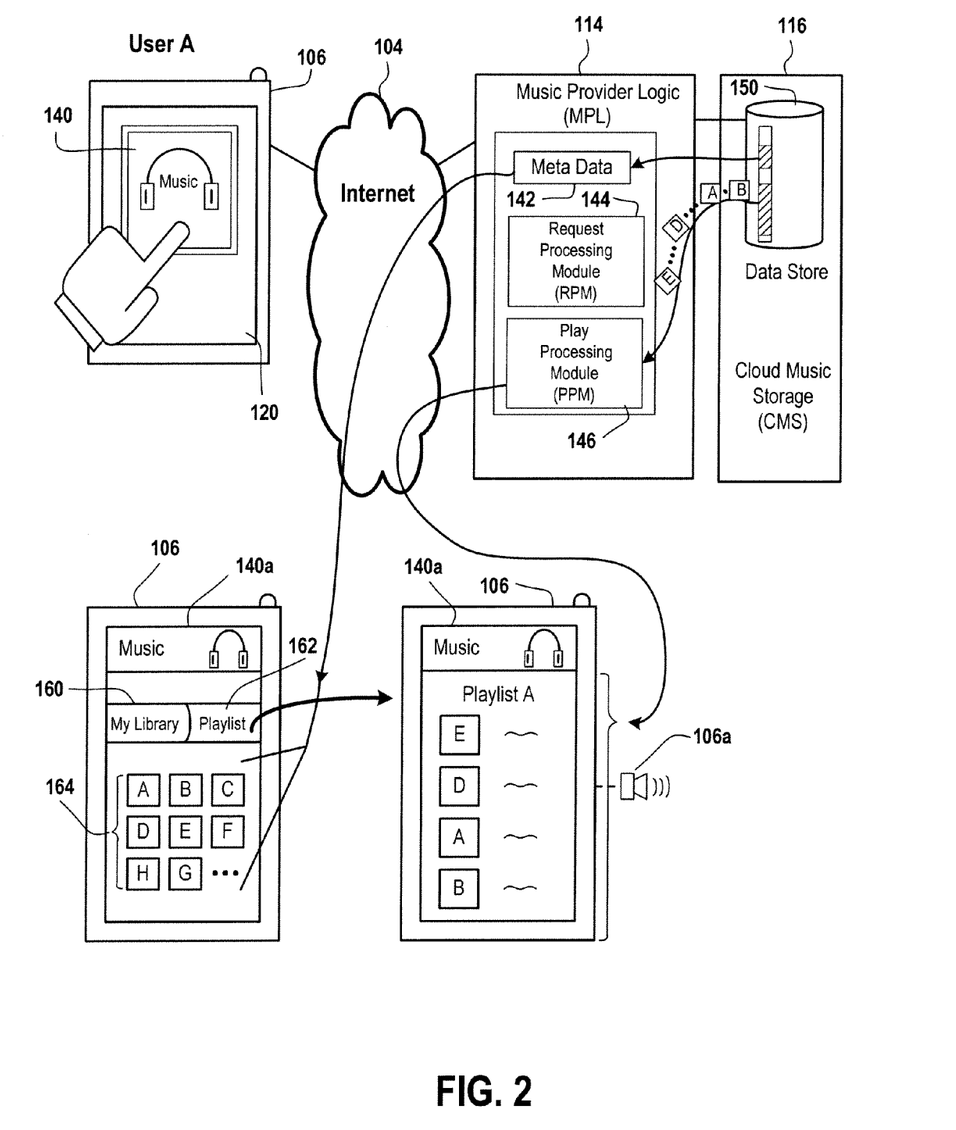
FIG. 2 illustrates how user A utilizes a device 106 (e.g. smart phone) to access his or her music library stored in the cloud music storage (CMS) 116, in accordance with one embodiment of the present invention.

FIG. 2 illustrates how user A utilizes a device 106 (e.g. smart phone) to access his or her music library stored in the cloud music storage (CMS) 116, in accordance with one embodiment of the present invention. As shown, the device 106 will include a screen 120, and associated graphical icons that present a thumbnail of an application 140, associated with a music application. Application 140, as described herein, relates to an application that provides a user with access to his or her music library which has been previously added to the club music storage 116. If the user is a new user to the application 140, the new user can download application 140 to device 106 from at least one server 110 of the digital service provider 102.

Once the application has been downloaded and installed on device 106, the icon representing application 140 will be rendered on the display screen of device 106. Initially, the user will be prompted to select music to add to the cloud music storage 116. The music may be added from files currently maintained by the user on his or her device 106, on other devices of the user such as computers, other smart phone and or tablets, or other storage media. Additionally, the user can add music files that may be part of a music library maintained by another application. The other application may maintain a specific format for the music, and the music can be obtained and translated to standardize music files for addition to the cloud music storage 116.

Once the user has managed his library to add, modify, or adjust the music files present in the cloud music storage 116, the user can access application 140 and various options from graphical user interfaces provided on the screen 120 of device 106. In the illustrated example, device 106 will open application 140 through various graphical user interface screens, such as interface 140a. Interface 140a can include various menus, selection icons, configuration icons, displays, advertisements, buttons, listings, etc. In this example, the interface 140a may include an icon that lists the users library 160, the users play list 162, and music title icons 164. Music title icons can be represented by graphical artwork that represents artwork associated with the various music files present in the users library. The users library is illustrated by title icons 164, shown as A-H.

The title icons 164 are rendered on the screen 120 upon obtaining metadata from the cloud music storage 116, which may be present in data store 150. Music provider logic 114 will include request processing module 144 that manages the requests and communication between various users applications 140 and the cloud music storage 116. The request processing module (RPM) 144 is also in communication with a play processing module (PPM) 146. In order to render the title icons 164 on the screen of the device 106, the music processing logic 114 will utilize the request processing module 144 to obtain metadata 142 from the data store 150.

The metadata 142 will be the metadata associated with the various music files stored in data store 150 for the requesting user. The metadata 142 provides information regarding each of the titles stored in the cloud music storage 116, and sufficient information to render the title icons 164 on the screen of device 106, and provide text information, duration information, genre information, and other data that describes aspects or characteristics of the music files. One example of metadata is an ID3 tag, which can contain information such as title, artist, album, year, track number, genre, etc. As shown, when the user selects play list 162 on device 106, a play list graphical user interface is shown identifying particular songs that have been arranged by the user.

The playlist A represents various songs that were selected by the user to be part of playlist A. The user can have various playlists, and the selection of playlist A is only provided as one example of a playlist that includes music files that are played in the order E→D→A→B. Once the user selects a corresponding play button or clicks on one of the audio files in the playlist, the music files will begin to play in the order arranged and defined by the user in his or her playlist A.

Figure 3:
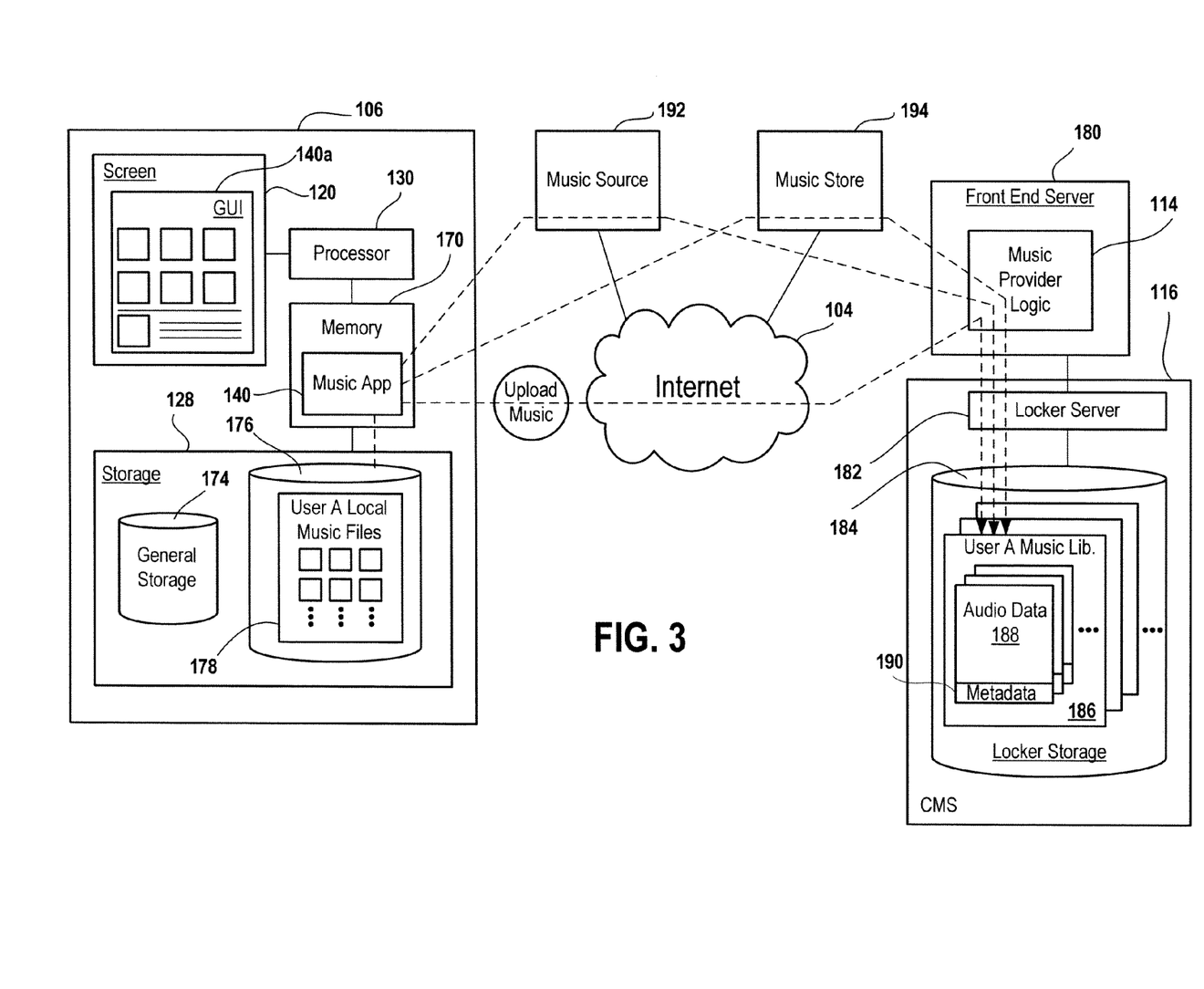
FIG. 3 illustrates how a user may upload music to their cloud-based music library, in accordance with an embodiment of the invention.

FIG. 3 illustrates how a user A may upload music to their cloud-based music library, in accordance with an embodiment of the invention. As shown, the music application 140 is executed in a memory 170 of the device 106. The device 106 includes persistent storage 128 which contains general storage 174 and local music storage 176. The local music storage 176 includes various music files 178 which the user A has stored on the device 106. The music application 140 provides an interface 140a shown on the display 120 of the device 106, which enables the user A to manually or automatically upload one or more of the music files 178 to the user's music library 186.

In one embodiment, the music application 140 detects the music files 178 and communicates with the music provider logic 114 via the Internet 104. The music provider logic 114 executes on a front end server 180. The music provider logic 114 communicates with a locker server 182 which manages access to a locker storage 184. The locker storage 184 contains various users' individual music libraries, including user A's music library 186. The music library 186 includes various audio files, each of which is defined by audio data 188 and associated metadata 190. Thus, in one embodiment, the music application 140 transmits one or more of the locally stored music files 178 to the music provider logic 144 which accesses the locker server 182 to store the music files within the user's music library 186.

It will be noted that music files from various other sources may also be uploaded to the user's music library 186. For example, music files from an external music source 192 that is available via the Internet 104 can be uploaded to the user's music library 186. In one embodiment, the music application 140 enables the user A to access, listen to, and authorize uploading of a music file from the external source 192. One example of an external music source is an online music store 194, from which the user A may purchase music for downloading to the user's music library. It will be appreciated that in the illustrated embodiment, by purchasing music from the music store 194, the user A causes a music file to be transferred from the music store 194 to the user A's music library 186. This is distinguished from a conventional online purchase where data is transferred to the user's client device. In the presently described embodiment, the data is transferred to a cloud-based storage library, which the user then accesses utilizing a client device 106.

Figure 4:
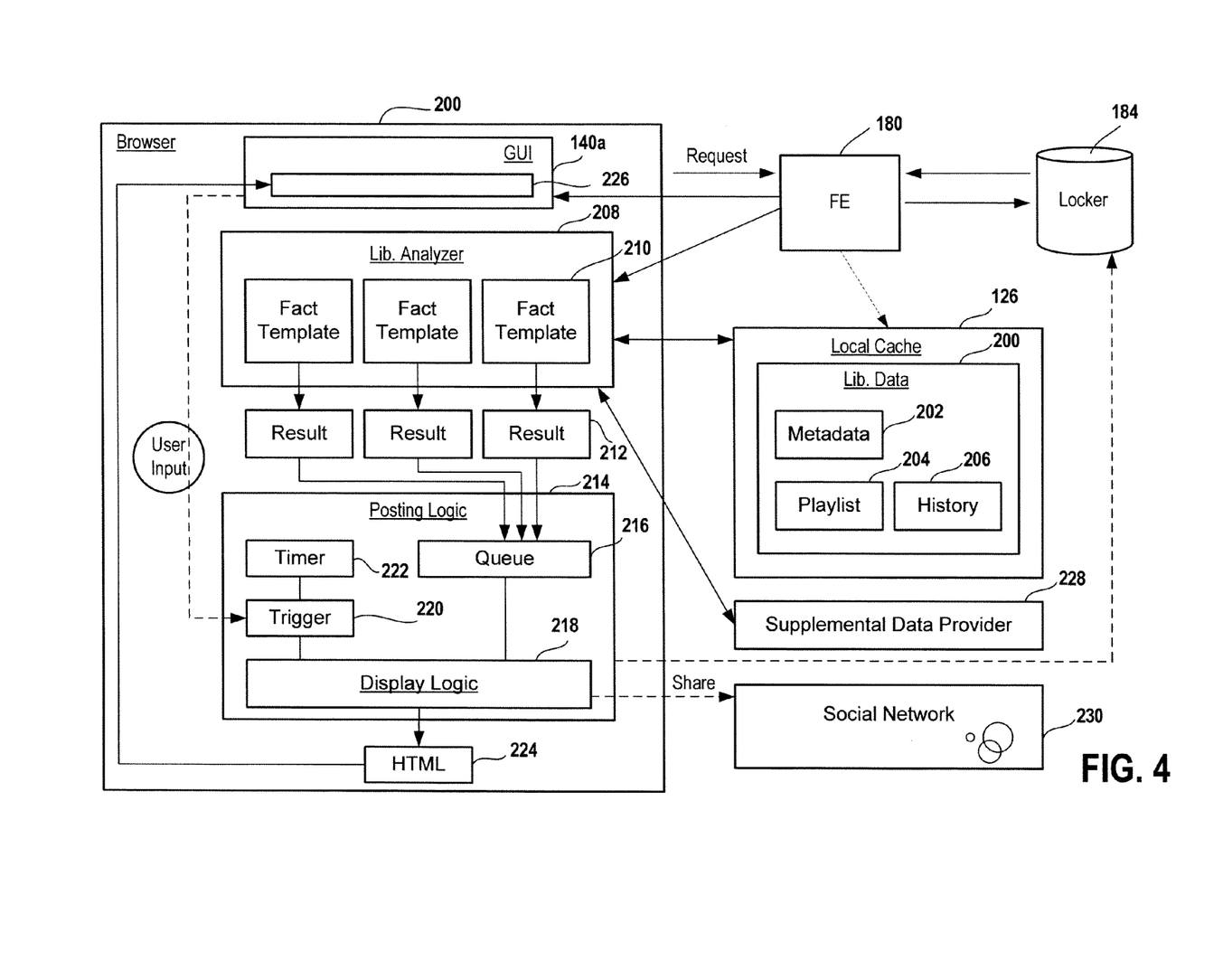
FIG. 4 illustrates a system for surfacing auto-generated facts about a music library, in accordance with an embodiment of the invention.

FIG. 4 illustrates a system for surfacing auto-generated facts about a music library, in accordance with an embodiment of the invention. In one embodiment, the user accesses their music library via a browser application 200 executing on the user's client device. In response to a request to access the user's music library, the front end server 180 provides a web-based interface 140a that is rendered by the browser 200, and which enables the user to access and manage their music library. The request also triggers downloading of library data 200 into the client device's local cache 126. The library data 200 includes various kinds of data relating to the user's music library, and can include metadata 202 from the audio files contained in the user's music library, playlists 204, and history data 206.

Additionally, the request to access the music library triggers downloading of script code (e.g. javascript) to the client device that is configured to surface auto-generated facts about the user's music library. In one embodiment, the script code includes a library analyzer 208 and posting logic 214. The library analyzer 208 is configured to perform analysis of the library data 200 according to one or more downloaded fact templates 210. The fact templates define analytical constructs for determining particular facts of interest about the user's music library, and are described in further detail below. In one embodiment, the fact templates are configured for analysis of only the metadata 202 of the user's music library; whereas in other embodiments, the fact templates are configured for analysis of other data such as playlist data 204, library history 206, or any other kind of data pertaining to the user's music library.

The library analyzer 208 applies the fact templates 210 to the locally stored library data 200 to yield factual results 212, which are loaded in a queue 216 of the posting logic 214 for eventual display on the interface 140a. In order to display a factual result, a display logic 218 generates display code 224 (e.g. HTML code) which defines a display of the factual result in a predefined location 226 of the interface 140a. In one embodiment, a trigger 220 is defined to trigger the display logic 218 to retrieve a factual result from the queue 216 for display on the interface 140a.

In one embodiment, the queue 216 functions in a first-in-first-out manner, such that the trigger 220 triggers retrieval of factual results from the queue in the order in which they are stored. In other embodiments, the trigger 220 may be configured to trigger the display logic 218 to retrieve specific types of factual results from the queue in a preferential manner based on factors such as user input and interaction with the interface 140a, current or recent song plays, etc. For example, if the user is currently playing a song or album by a particular artist, then the trigger 220 could be configured to preferentially trigger display of a factual result relating to the artist or the artist's genre if such a result is available in the queue. In one embodiment, the trigger 220 is activated based on user inputs and/or library access activity. For example, the next factual result in the queue 216 could be triggered for display each time a new song is played, each time the user activates a particular feature, or each time the interface page is refreshed. In another embodiment, a timer 222 activates the trigger 220 at predefined intervals, so that the display of results in the interface 140a cycles through the results in the queue. The predefined intervals can be periodic, scheduled, randomly generated, etc.

In one embodiment, the library analyzer 208 accesses a supplemental data provider 228 in order to perform the analysis defined by a particular fact template. For example, the supplemental data provider 228 may provide information relating to the user's music library, such as song lyrics, song statistics, artist statistics, ratings/popularity information, etc.

In one embodiment, results can be stored and associated with the user's music library, thereby providing a historical record of facts which are indicative of the state of the user's music library at the specific times when the facts were determined Fact templates can be configured to define analysis constructs which utilize this historical fact data to generate interesting new facts about the user's library.

In one embodiment, the posting logic 214 is configured to facilitate sharing of the results from the analysis of the library data 200. For example, the posting logic 214 could be configured to enable sharing of a result on a social network 230.

Figure 5:
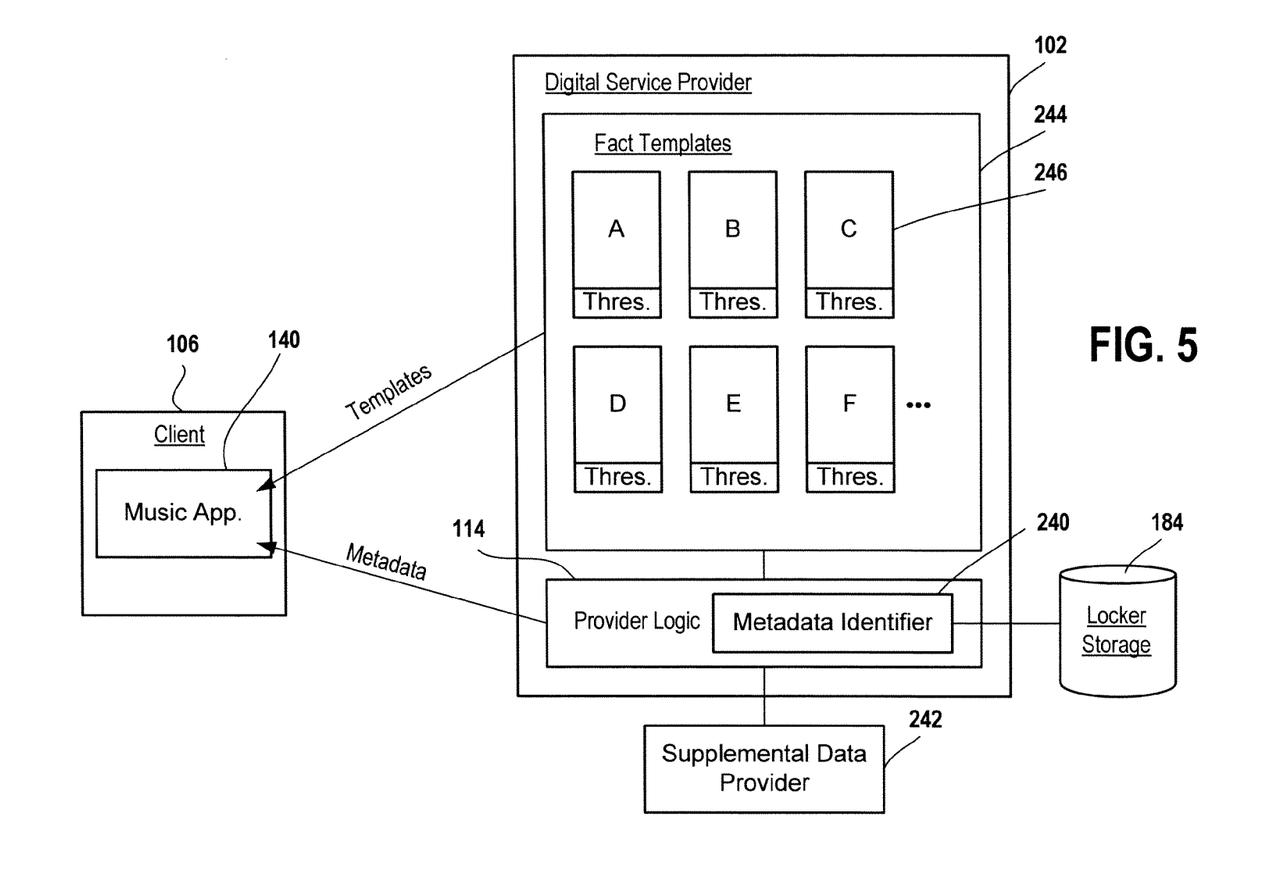
FIG. 5 illustrates the retrieval of metadata associated with audio files and fact templates for analysis of the metadata, in accordance with an embodiment of the invention.

FIG. 5 illustrates the retrieval of metadata associated with audio files and fact templates for analysis of the metadata, in accordance with an embodiment of the invention. As shown, the client device 106 executes a music application 140. In one embodiment, the music application 140 can be defined by a browser application and downloaded script code as has been described above. In other embodiments, the music application 140 can be a standalone application, an extension or plug-in, etc.

The music provider logic 114 includes a metadata identifier 240 that is configured to identify and retrieve metadata associated with the audio files contained in the user's music library. In some instances, there may be audio files with incomplete metadata. Therefore, in one embodiment, the retrieved metadata can be supplemented from an external supplemental data provider 242, that provides additional metadata. It will be noted that metadata from the supplemental data provider 242 can be written to the audio files in the user's music library to fill in incomplete metadata fields or replace or correct existing metadata. As noted previously, the retrieved metadata is sent to the client where it is stored in a local cache.

Additionally, a fact template storage 244 stores various fact templates 246, which define analytical constructs for the determination of factual results relating to the user's music library. In one embodiment, each fact template 246 defines a specific analysis of the cached metadata in order to provide a factual result which can be displayed to the user. Examples of facts about the user's library which can be determined according to fact templates include the following: percentage of music library that has or has not been played; most popular words in song titles; percentage of library from a certain decade; number of songs of a particular artist versus number of songs in a particular genre; total amount of time spent listening to music (e.g. provided in days or another time measurement); total amount of time of music of a certain genre in library; which genre is most neglected based on amount of songs played; percentage of library that is most liked/disliked; artist with most songs in library that have not been played; number of hours spent listening to a specific artist; etc. Various additional examples of facts about a music library which may be determined and presented are provided in Table I below.

TABLE I

You love the [whatever decade is the highest percentage]! X% of your library is from that decade.
30% of your music library has never been played
Your longest track is "Bla bla bla" at 45 minutes. This is longer than your 30 shortest songs.
Is your Led Zeppelin collection just for looks? They're your biggest artist without a single play.
Monday's fine for tunes: You listen to more music on that day than any other.
You have 1 song each for 30% of the artists in your library
40% of the songs in your library have unspecified genres
The most popular genres in your library are "Rock," "Pop," and "Electronic"
You have the most songs by these artists: "The Beatles," "The Rolling Stones" and "Fleetwood Mac"
"Never Gonna Give You Up" is your most skipped song
Compare percentage of music listened web vs. mobile
Rate at which your music library expands (i.e. how many songs added per day/total songs)
(thumbs up icon) You love 1% of your library (you love 0% of your library, looks like you don't use thumbs-up!)
(thumbs down icon) You don't like 6% of your library
(if you can cross check weather) Show genres, songs, etc. that you like
to listen to on rainy, sunny, snowy days etc.
The most popular words in your song titles are "peace," "love," and "pancakes"
X: The average number of songs per genre in your library
Y: The average number of artists per genre in your library
Z: The average number of songs per artists in your library
S: The average number of albums per artist in your library
You have 7.8 days of music in your library
You could go X days without running out of music
You have 7.8 days of "Rock" in your library
12% of your library is by an unspecified artist
Tuesday is a quiet day: You're least likely to be using Google Music on a Tuesday
You love [whatever genre is the highest percentage]! X% of your library is X.
"You should look for more music in X, Y, Z, genre; you only have one TABLE I-continued song of each of these." (a set of esoteric genres that user only has one song from)
Most played playlists
Total # of songs played
Most played genre(s)
You have the most songs from these genres . . . but your most played genres are . . . (could also cite just one genre)
Genre distribution of your 50 most played songs
You have the most albums by X
You have 10 tracks with the title X
# of artists played
This is one of your most played songs, but you haven't played it recently
Total # of hours spent listening to music (compare with various activities/events requiring similar amount of time)

In one embodiment, a fact template 246 may also define a threshold requirement before the calculation defined by the fact template is performed or before a particular fact is displayed. For example, some facts about a music library may not be particularly interesting until the library has reached a certain size. Therefore, the fact template for such a fact may define a threshold requirement that the library contain a minimum number of files before the analysis defined by the fact template is performed to provide the factual result. Other examples of threshold requirements could include the following: a minimum number of songs from a particular artist or genre; a minimum total length of time of the library; a minimum or maximum percentage of the library that is of a particular genre; a certain amount that a music library has been played (as measured by number of song plays, e.g.); a certain number of tracks/songs that have been rated; etc.

While certain embodiments have generally been described with reference to analysis of metadata and other data according to fact templates being performed on a client device, it will be appreciated that in other embodiments, such analysis may be performed at the server and the results then transmitted to the client device. For example, in one embodiment, the aforementioned library analyzer 208 is situated on a server, with the results of the analysis being transmitted to the posting logic 214 on the client device. In another embodiment, the posting logic 214 can also be situated on the server, with the display code 224 being transmitted to the client device for rendering on the client device's display.

Figure 6A:
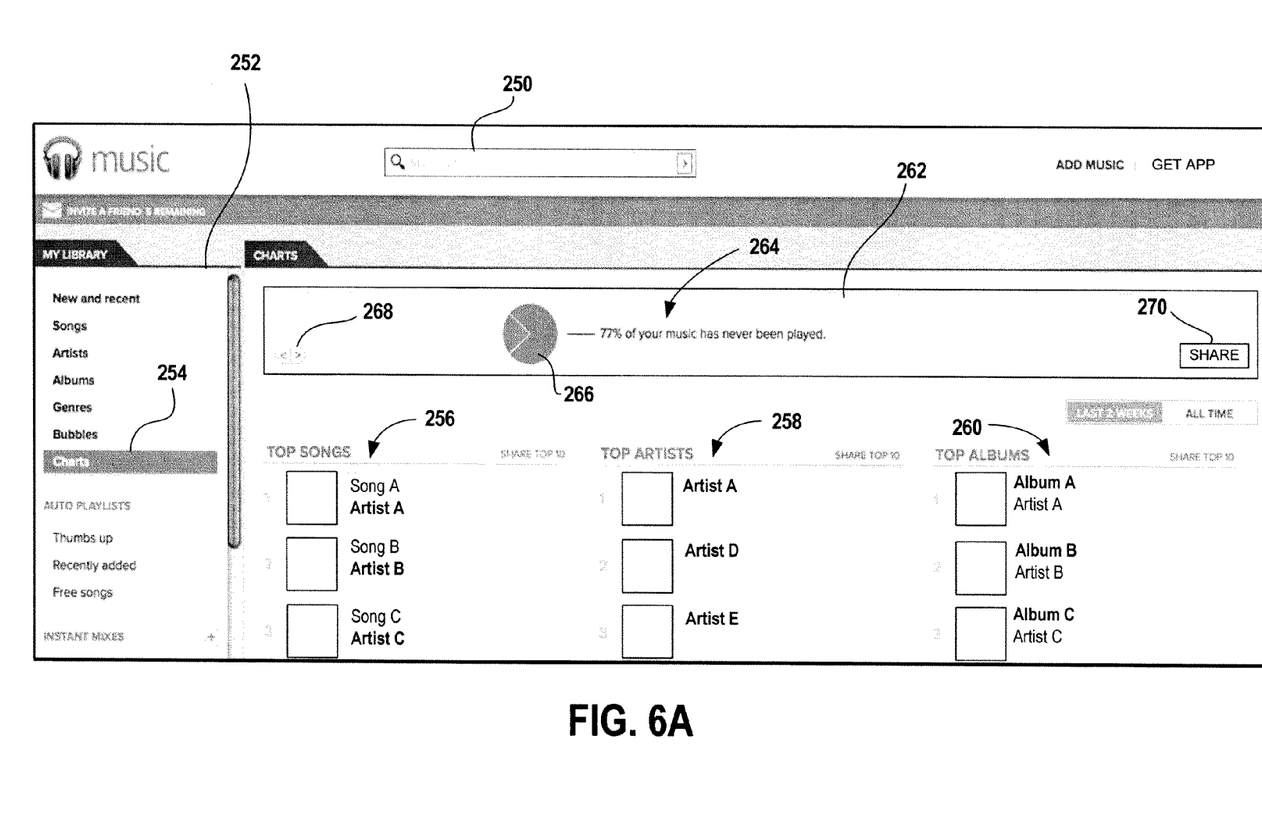
FIG. 6A illustrates an interface for accessing a music library, in accordance with an embodiment of the invention.

FIG. 6A illustrates an interface for accessing a music library, in accordance with an embodiment of the invention. The interface includes a search bar 250 for enabling the user to search their music library based on entered key words. The interface also includes a menu panel 252, from which the user may choose different views of the library. For example, if the user selects the "Artists" category from the menu panel, then the artists in the user's library are displayed, from which the user may select a particular artist to view the songs and albums associated with that artist; whereas if the user selects "Genres" from the menu panel 252, then the various genres within the user's music library are shown, from which the user may select a particular genre to view songs within that genre. In the illustrated embodiment, the user has selected "Charts" from the menu panel, and thus various charts are shown in the interface display. For example, a top songs chart 256, a top artists chart 258, and a top albums chart 260 are displayed.

A fact display 262 presents a fact about the user's music library at a predefined location in the interface display. The fact display 262 includes descriptive text 264 which describes the fact as well as a graphical icon 266 that provides a graphical indication of the fact. In the illustrated embodiment, the descriptive text 264 states that 77% of the user's music has never been played. As shown, the graphical icon 266 is a pie chart that is configured to display the fractional amount of the fact (77%).

In one embodiment, scroll buttons 268 are provided which enable the user to cycle to the next or previously displayed fact about the user's music library. Additionally, a share button 270 is provided to enable the user to share the fact via various communication methods, such as via a social network, e-mail, etc.

Figure 6B:
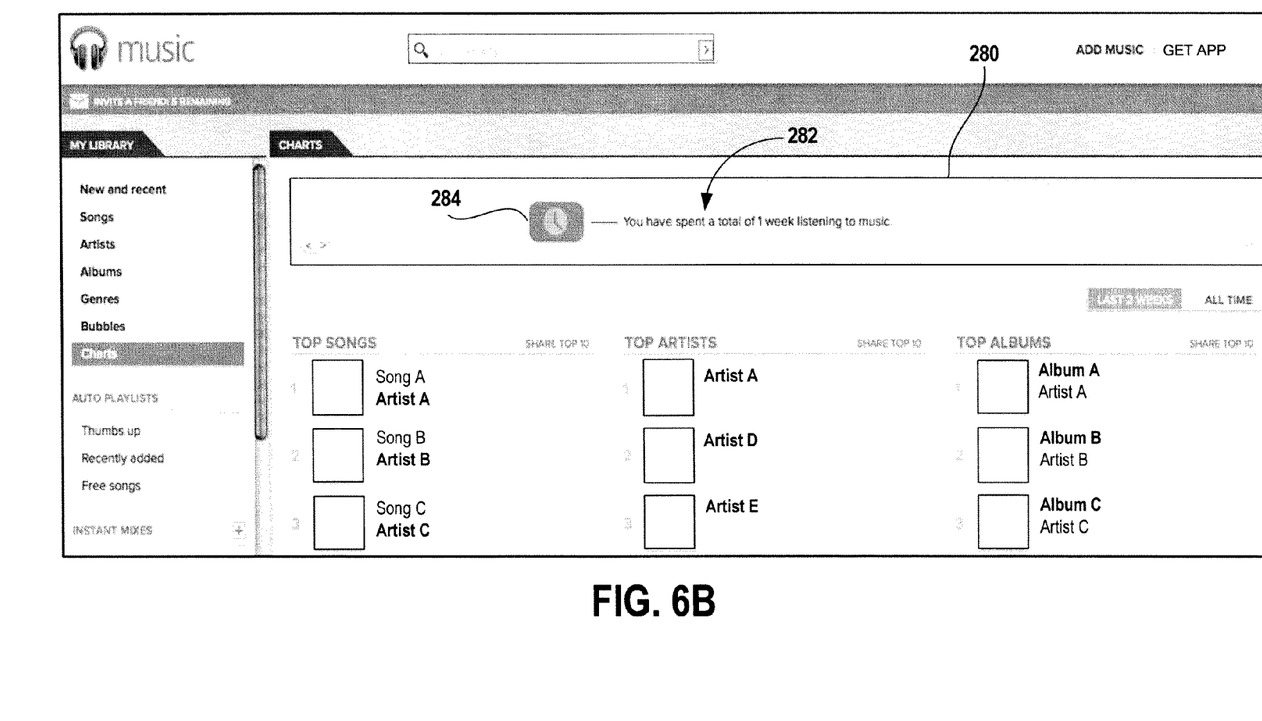
FIG. 6B illustrates an interface for accessing a music library, in accordance with an embodiment of the invention.

FIG. 6B illustrates an interface for accessing a music library, in accordance with an embodiment of the invention. As shown, the interface includes a fact display 280 for displaying a factual result about the user's music library based on analysis of metadata in accordance with principles described herein. In the illustrated embodiment, the fact display 280 includes text 282 which indicates that the user has spent a total of one week listening to music. Also, the fact display 280 includes a graphical icon 284 in the form of a clock, indicating the type of factual display which is being shown.

Figure 7A:
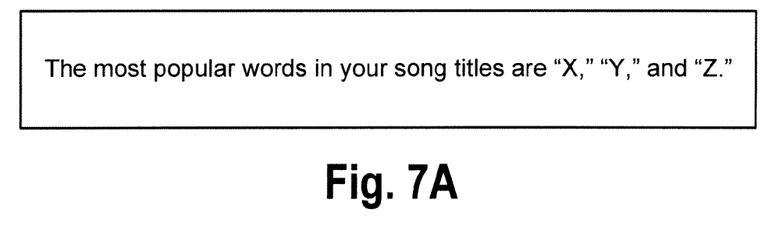
FIGS. 7A-E illustrate various examples of factual displays, in accordance with embodiments of the invention.
Figure 7B:
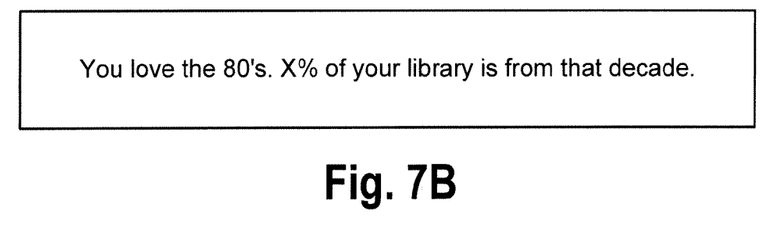
Figure 7C:
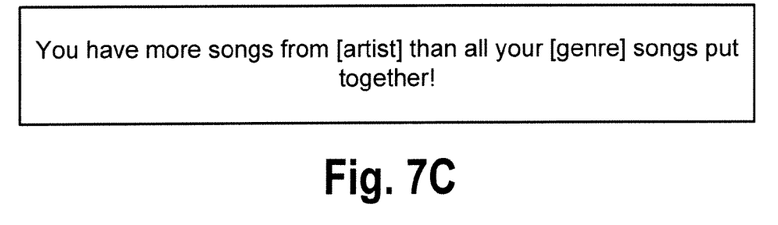
Figure 7D:
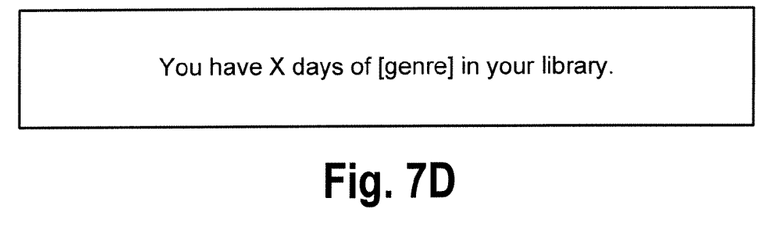
Figure 7E:
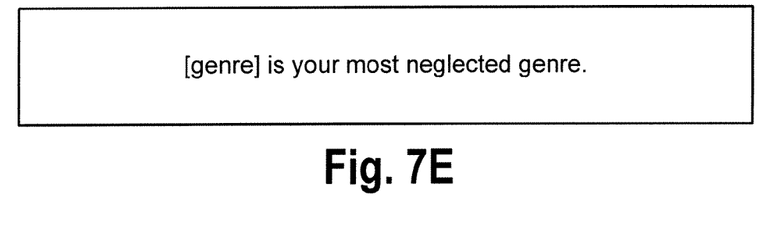

FIGS. 7A-E illustrate various examples of factual displays, in accordance with embodiments of the invention. FIG. 7A illustrates a factual display which indicates the most popular words in a library's song titles. FIG. 7B illustrates a factual display indicating a decade from which a large percentage of the user's library is from. FIG. 7C illustrates a factual display indicating the the user has more songs from a particular artist that all songs of a particular genre. FIG. 7D illustrates a factual display indicating that the user has a certain number of days of particular genre of music in the user's library. FIG. 7E illustrates a factual display indicating that a specific genre is the user's most neglected genre.

Figure 8:
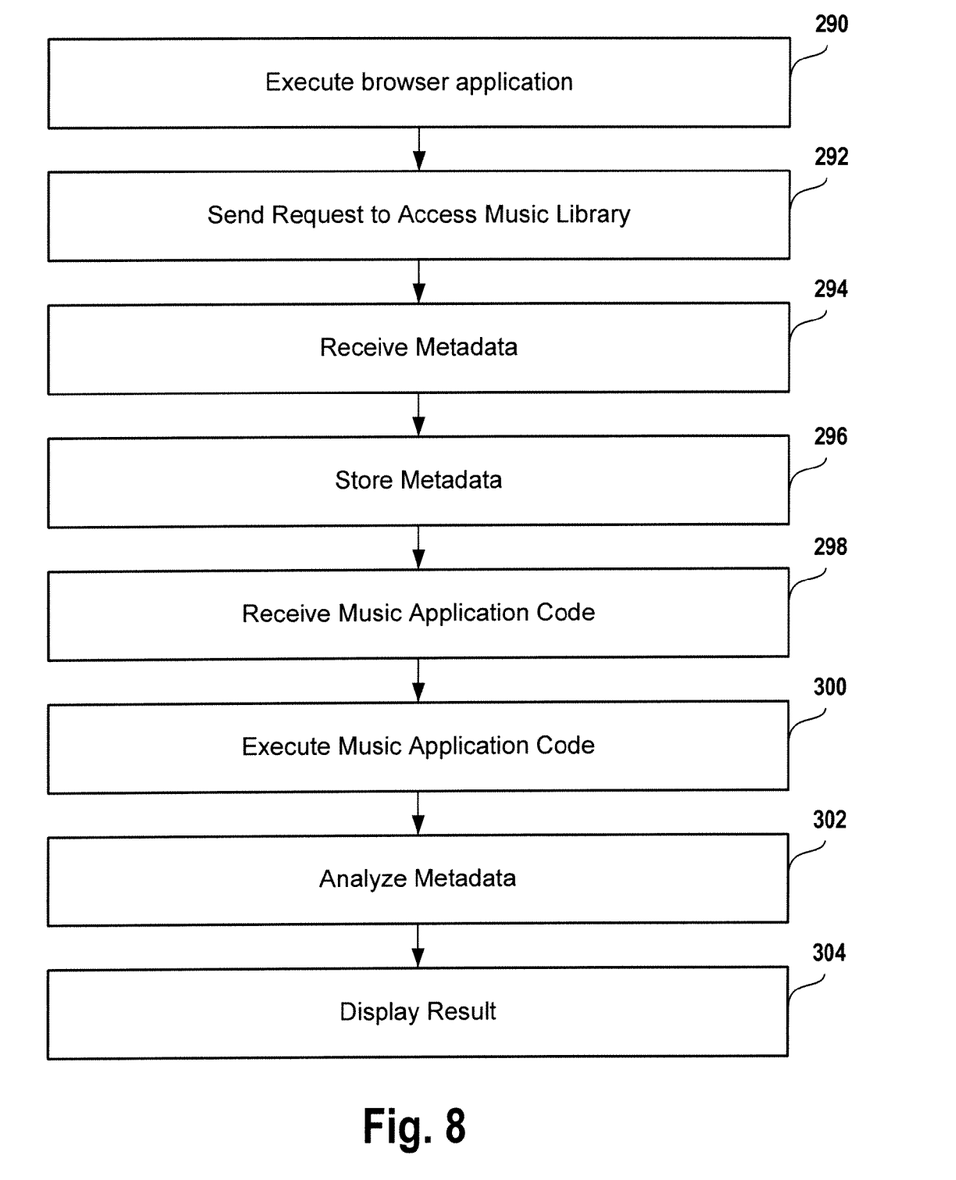
FIG. 8 illustrates a method for surfacing auto-generated facts about a music library, in accordance with an embodiment of the invention.

FIG. 8 illustrates a method for surfacing auto-generated facts about a music library, in accordance with an embodiment of the invention. At method operation 290, the method initiates with executing a browser application. At method operation 292, a request is sent via the browser application to a server to access an online music library associated with a user. The music library includes a plurality of audio files, each of the audio files including audio data and metadata associated with the audio data. At method operation 294, the metadata of the audio files in the music library is received from the server. At method operation 296, the received metadata is stored in a local cache on the client device. At method operation 298, music application code from the server. At method operation 300, the music application code is executed in the browser application on the client device. At method operation 302, the stored metadata in the local cache is analyzed according to a fact template included in the music application code. At operation 304, a result of the analysis is displayed in the browser application on the client device.

While presently described embodiments of the invention have generally be described with reference to music files and to a music library, it will be appreciated that the principles described herein apply equally to any type of audio file having associated metadata or any kind of audio library.

Figure 9:
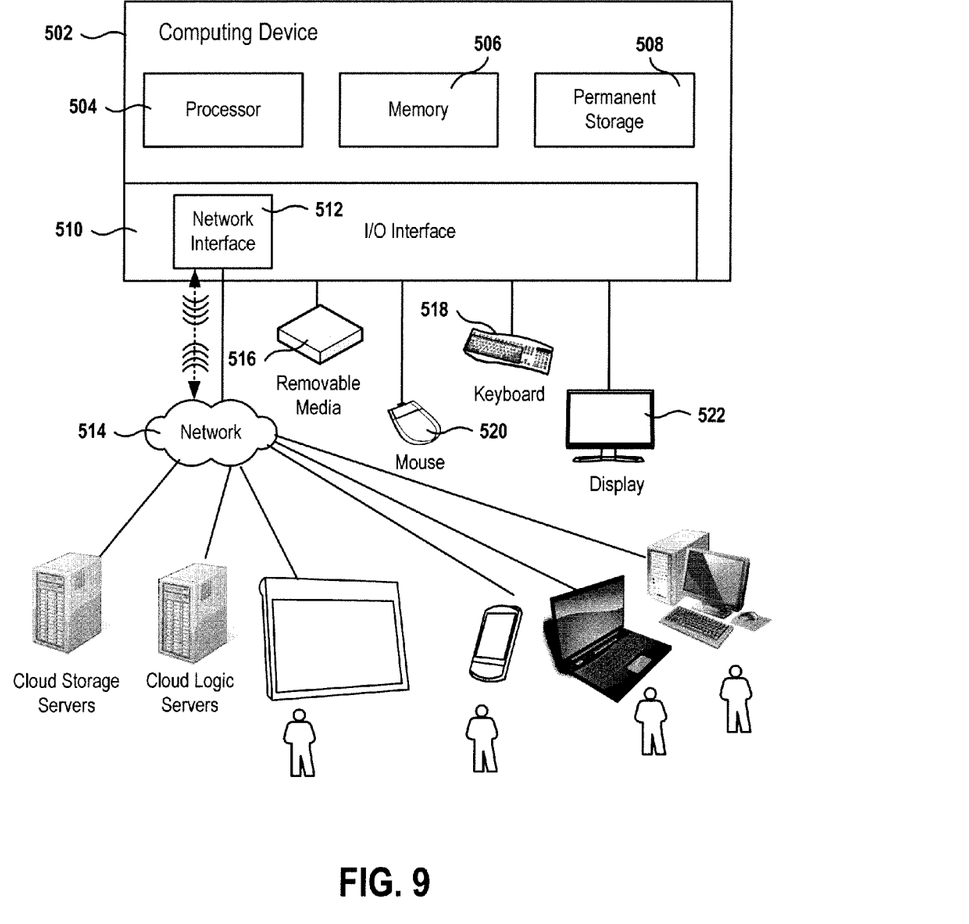
FIG. 9 is a simplified schematic diagram of a computer system for implementing embodiments of the present invention.

FIG. 9 is a simplified schematic diagram of a computer system 902 for implementing embodiments of the present invention. FIG. 9 depicts an exemplary computer environment for implementing embodiments of the invention. It should be appreciated that the methods described herein may be performed with a digital processing system, such as a conventional, general-purpose computer system. Special purpose computers, which are designed or programmed to perform only one function, may be used in the alternative. The computer system 502 includes a processor 504, which is coupled through a bus to memory 506, permanent storage 508, and Input/Output (I/O) interface 510.

Permanent storage 508 represents a persistent data storage device such as a hard drive or a USB drive, which may be local or remote. Network interface 512 provides connections via network 514, allowing communications (wired or wireless) with other devices. It should be appreciated that processor 504 may be embodied in a general-purpose processor, a special purpose processor, or a specially programmed logic device. Input/Output (I/O) interface 510 provides communication with different peripherals and is connected with processor 504, memory 506, and permanent storage 508, through the bus. Sample peripherals include display 522, keyboard 518, mouse 520, removable media device 516, etc.

Display 522 is configured to display the user interfaces described herein. Keyboard 518, mouse 520, removable media device 516, and other peripherals are coupled to I/O interface 510 in order to exchange information with processor 504. It should be appreciated that data to and from external devices may be communicated through I/O interface 510. Embodiments of the invention can also be practiced in distributed computing environments where tasks are performed by remote processing devices that are linked through a wired or a wireless network.

Embodiments of the present invention can be fabricated as computer readable code on a non-transitory computer readable storage medium. The non-transitory computer readable storage medium holds data which can be read by a computer system. Examples of the non-transitory computer readable storage medium include permanent storage 508, network attached storage (NAS), read-only memory or random-access memory in memory module 506, Compact Discs (CD), Blu-ray™ discs, flash drives, hard drives, magnetic tapes, and other data storage devices. The non-transitory computer readable storage medium may be distributed over a network-coupled computer system so that the computer readable code is stored and executed in a distributed fashion.

Additionally, FIG. 9 shows various types of devices that can connect to the network, such as the internet. The devices include servers, tablet computers, smartphones, laptops, desktops, etc. The various devices an run operating systems and the operating systems can vary from manufacturer to manufacturer.

Some, or all operations of the method presented herein are executed through a processor, such as processor 504 of FIG. 9. Additionally, although the method operations were described in a specific order, it should be understood that some operations may be performed in a different order, when the order of the operations do not affect the expected results. In addition, other operations may be included in the methods presented, and the operations may be performed by different entities in a distributed fashion, as long as the processing of the operations is performed in the desired way.

In addition, at least one operation of some methods performs physical manipulation of physical quantities, and some of the operations described herein are useful machine operations. Embodiments presented herein recite a device or apparatus. The apparatus may be specially constructed for the required purpose or may be a general purpose computer. The apparatus includes a processor capable of executing the program instructions of the computer programs presented herein.

Although the foregoing embodiments have been described with a certain level of detail for purposes of clarity, it is noted that certain changes and modifications can be practiced within the scope of the appended claims. Accordingly, the provided embodiments are to be considered illustrative and not restrictive, not limited by the details presented herein, and may be modified within the scope and equivalents of the appended claims.

What is claimed is:

1. A method for surfacing auto-generated facts about an online music library, comprising:
   receiving from a client device a request to access an online music library associated with a user, the online music library including a plurality of audio files, each of the plurality of audio files including audio data and metadata associated with the audio data;
   applying a fact template to the metadata associated with the plurality of audio files to generate a result, the fact template defining an analysis to be performed on the metadata, the fact template defining a threshold requirement for performance of the analysis defined by the fact template;
   transmitting to the client device a music application script code configured to be executed by a browser application on the client device, the music application script code including posting logic configured to display the result of the analysis performed according to the fact template in said browser application on the client device.

2. The method of claim 1,
   wherein the music application script code defines an interface for managing and streaming the plurality of audio files of the online music library;
   wherein the posting logic is configured to display the result in a predefined window of the interface.

3. The method of claim 1,
   wherein the result of the analysis defines a fractional amount of the online music library.

4. The method of claim 3,
   wherein the posting logic is configured to adjust an icon in accordance with the fractional amount and display said icon on the client device.

5. The method of claim 1,
   wherein the analysis defined by the fact template parses one or more of the following from the metadata: title, genre, artist, duration, rating, number of times played.

6. The method of claim 1,
   wherein the threshold requirement defines a minimum number of audio files having a specified metadata feature.

7. The method of claim 6, wherein the specified metadata feature is selected from an artist, a genre, a rating, or a minimum number of plays.

8. The method of claim 1, wherein the threshold requirement defines one of a minimum number of audio files or a minimum length of time.

9. The method of claim 1, wherein displaying the result includes displaying a share button for sharing the result to a social network.

10. A method for surfacing auto-generated facts about an online music library, comprising:
    receiving from a client device a request to access an online music library associated with a user, the online music library including a plurality of audio files, each of the plurality of audio files including audio data and metadata associated with the audio data;

applying a plurality of fact templates to the metadata associated with the plurality of audio files to generate a plurality of results, each fact template defining an analysis to be performed on the metadata, wherein at least one of the plurality of fact templates defines a threshold requirement for performance of the analysis defined by the at least one of the plurality of fact templates;

storing the plurality of results in a queue;

transmitting to the client device a music application script code configured to be executed by a browser application on the client device, the music application script code including posting logic configured to retrieve and display results from the queue in said browser application on the client device;

wherein the posting logic is configured to display the results in a predefined window of a graphical user interface for managing and streaming the plurality of audio files of the online music library.

11. The method of claim 10, wherein the posting logic is configured to retrieve and display the results from the queue in an order in which the results are stored to the queue.

12. The method of claim 10, wherein the posting logic is configured to retrieve and display the results from the queue based on one or more of user input, user interaction with the graphical user interface, a recent song play, a current song play, or a timer.

13. The method of claim 10, wherein the posting logic is configured to retrieve and display a result from the queue in response to playback of a new song.

14. A non-transitory computer readable medium containing program instructions embodied thereon for surfacing auto-generated facts about an online music library, the program instructions for:

receiving from a client device a request to access an online music library associated with a user, the online music library including a plurality of audio files, each of the plurality of audio files including audio data and metadata associated with the audio data;

applying a fact template to the metadata associated with the plurality of audio files to generate a result, the fact template defining an analysis to be performed on the metadata, the fact template defining a threshold requirement for performance of the analysis defined by the fact template;

transmitting to the client device a music application script code configured to be executed by a browser application on the client device, the music application script code including posting logic configured to display the result of the analysis performed according to the fact template in said browser application on the client device.

15. The non-transitory computer readable medium of claim 14, wherein the music application script code defines an interface for managing and streaming the plurality of audio files of the online music library;

wherein the posting logic is configured to display the result in a predefined window of the interface.

16. The non-transitory computer readable medium of claim 14, wherein the result of the analysis defines a fractional amount of the online music library;

wherein the posting logic is configured to adjust an icon in accordance with the fractional amount and display said icon on the client device.

17. The non-transitory computer readable medium of claim 14, wherein the analysis defined by the fact template parses one or more of the following from the metadata: title, genre, artist, duration, rating, number of times played.

18. The non-transitory computer readable medium of claim 14, wherein the threshold requirement defines a minimum number of audio files having a specified metadata feature;

wherein the specified metadata feature is selected from an artist, a genre, a rating, or a minimum number of plays.

19. The non-transitory computer readable medium of claim 14, wherein the threshold requirement defines one of a minimum number of audio files or a minimum length of time.

20. The non-transitory computer readable medium of claim 14, wherein displaying the result includes displaying a share button for sharing the result to a social network.

* * * * *